United States Patent [19]
Eloranta et al.
[11] Patent Number: 4,534,053
[45] Date of Patent: Aug. 6, 1985

[54] APPARATUS FOR EXCHANGING AN INTENSIFYING SCREEN AND A NEGATIVE IN A FILM PACKET

[75] Inventors: Vaito K. Eloranta, Needham; Joel M. Peisach, Malden; Donald E. Rogers, Jr., Billerica, all of Mass.

[73] Assignee: Polaroid Corporation, Cambridge, Mass.

[21] Appl. No.: 369,806

[22] Filed: Apr. 19, 1982

[51] Int. Cl.³ ........................ G03B 17/26; G03B 41/18
[52] U.S. Cl. .................................... 378/167; 378/187; 378/185; 354/276; 354/283; 414/411
[58] Field of Search ............... 378/167, 172, 173, 185, 378/187; 354/276, 283; 250/482.1, 483.1; 414/403, 411; 53/381 A, 169, 266 C

[56] References Cited

U.S. PATENT DOCUMENTS

| | | | |
|---|---|---|---|
| 1,000,630 | 8/1911 | Schmuck | 354/283 |
| 3,185,841 | 5/1965 | Land | 430/277 |
| 3,462,599 | 8/1969 | Erikson et al. | 378/167 |
| 3,930,165 | 12/1975 | Robinson et al. | 378/187 |
| 4,156,568 | 5/1979 | Erikson | 354/312 |
| 4,186,308 | 1/1980 | Erikson | 378/187 |
| 4,200,384 | 4/1980 | Josephson et al. | 354/304 |

*Primary Examiner*—Alfred E. Smith
*Assistant Examiner*—Charles F. Wieland
*Attorney, Agent, or Firm*—Stanley H. Mervis

[57] ABSTRACT

Apparatus for loading a radiographic film packet with an intensifying screen, and for discharging the exposed negative into automatic processing apparatus without the use of a darkroom.

3 Claims, 13 Drawing Figures

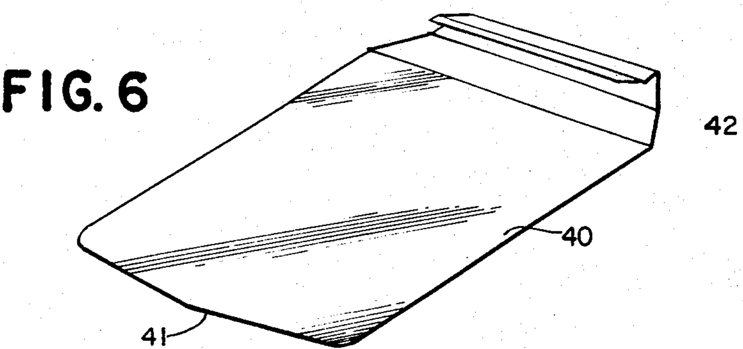
FIG. 6
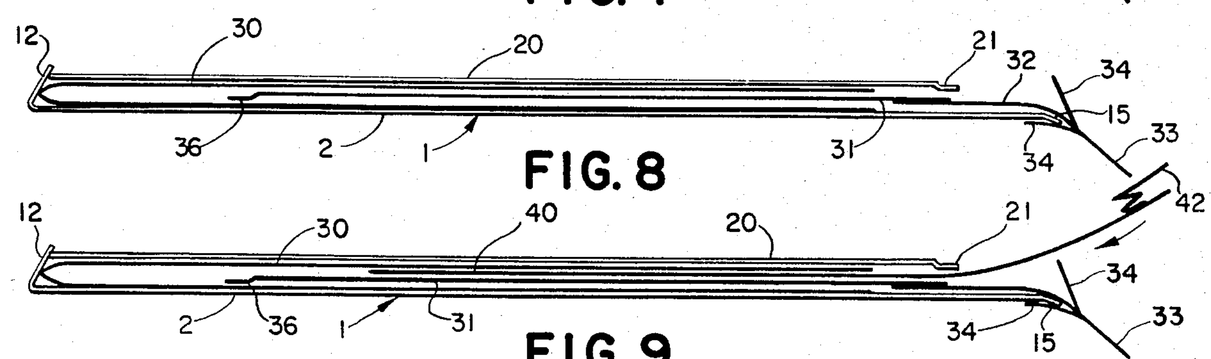
FIG. 7
FIG. 8
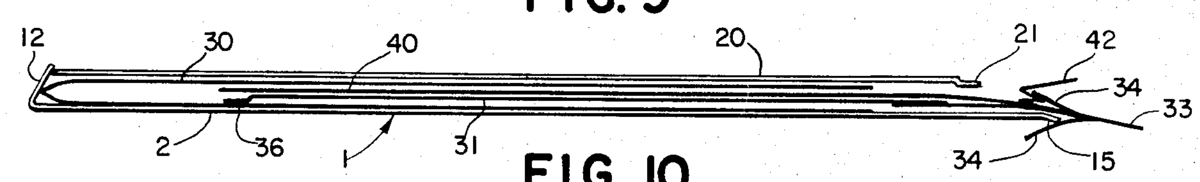
FIG. 9
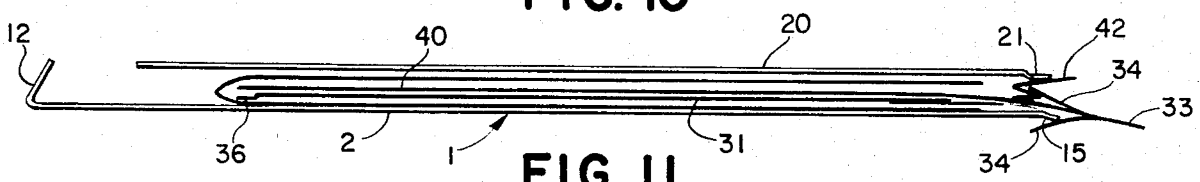
FIG. 10
FIG. 11
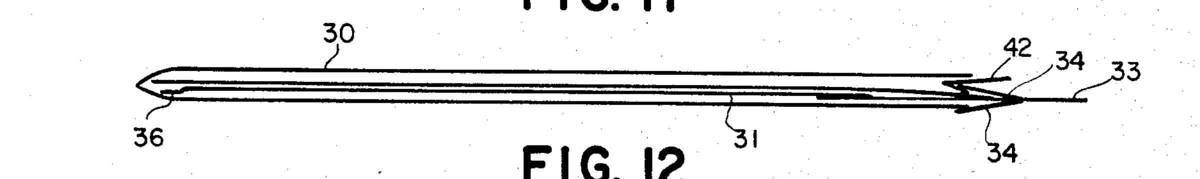
FIG. 12
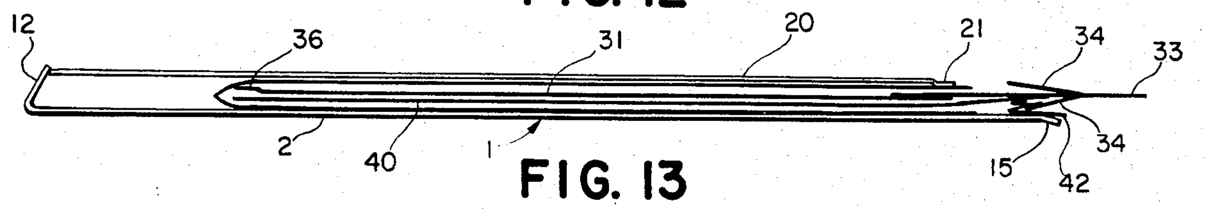
FIG. 13

APPARATUS FOR EXCHANGING AN INTENSIFYING SCREEN AND A NEGATIVE IN A FILM PACKET

BACKGROUND OF THE INVENTION

This invention relates to radiology, and particularly to novel apparatus for inserting an intensifying screen into an envelope containing a photographic negative without the use of a darkroom, and for extracting the negative from the package for processing.

Conventional radiographic techniques currently in use employ a cassette, where practical, containing a photosensitive negative together with an intensifying screen and means for pressing the emulsion side of the negative into contact with the screen during exposure. If it is impractical to use a cassette for the particular application involved, the intensifying screen is dispensed with and radiation dosage is increased to compensate for the correspondingly lower sensitivity of the photosensitive negative in the absence of the intensifying screen. Since the latter process requires radiation dosages which in many cases would be intolerably high, various proposals have been made for incorporating intensifying screens with negatives without the use of a rigid enclosing cassette structure. Among these, one approach that has been advanced is to incorporate the intensifier screen as a layer in an integral film unit construction with the photosensitive negative. Such a construction is shown and described, for example, in U.S. Pat. No. 3,185,841, issued on May 25, 1965 to Edwin H. Land for Photographic Product Having X-ray Intensifier Screen As An Integral Component Of The Image Receiving Sheet, and assigned to the assignee of this invention. To date, constructions of this type have not been made commercially available.

Another proposal, applicable to self-processing film units such as the Polaroid Land Type 52 4×5 film packets and the like, is described in U.S. Pat. No. 3,462,599, issued on Aug. 19, 1969 to Herman E. Erikson et al for Radiographic Appartus For Inserting An Intensifying Screen Into A Self-processing Photographic Film Pack, and assigned to the assignee of this invention. The latter patent describes apparatus for manipulating the self-processing film unit in a light-tight housing and thereby inserting a magnetic intensifying screen, prior to exposure of the film unit, and later removing it with the aid of a magnet. This approach requires the intensifying screen to have magnetic properties, and also makes use of the specific structural properties of the particular film unit with which it is concerned.

The object of this invention is to facilitate the association of an intensifying screen with a negative without requiring a darkroom and without placing any requirements for magnetic properties on the intensifying screen.

The above and other objects of the invention are attained by apparatus which is particularly adapted to cooperate with a photosensitive negative incorporated in an opaque envelope, such as the Polaroid transparent radiographic 8×10 Land Film Type TPX, for example, an 8×10 photosensitive unit commonly used in radiography. The Type TPX Film Packet is conventionally employed with a cassette which contains an intensifying screen, and comprises a negative having a leader extending out of an opaque envelope. This packet is placed in the cassette, and the envelope removed. After exposure, the cassette is placed in a processor, such as that shown in U.S. Pat. No. 4,200,384, issued on April 29, 1980 to Donald G. Josephson and Duncan C. Sorli for Photographic Apparatus For Coupling Together Elements Of A Self-Developing Film Unit, which is assigned to the assignee of this invention, wherein the exposed negative is associated with a receiving sheet and processed to produce a finished radiograph.

Briefly, the apparatus of the invention comprises a housing formed with a base plate in which a platen is slidably received for movement between stops formed integral with the base plate. An opaque envelope containing a negative attached to a leader extending from an open end of the envelope, such as the Type TPX film packet mentioned above, may be inserted between the platen and the base plate on the housing until one edge of an opaque encircling flap formed integral with the leader, which normally forms a light tight enclosure about the open end of the envelope, encounters a lip formed on the end of the base plate. Further movement of the envelope into the space between the platen and the base plate provides a gap between the end of the envelope and the flap on the leader into which the end of a radiographic element such as an intensifying screen, radiographic sample or the like can be inserted and moved down over and in contact with the emulsion side of the negative. The platen and envelope are then moved back together, with the platen providing needed rigidity and also forming a light seal, until the end of the envelope is again inside of and under the flap on the leader. The assemblage, now comprising the negative and intensifying screen enclosed in a light tight envelope, can then be removed and taken to the desired site for exposure.

After exposure, the radiographic packet is again placed in the apparatus of the invention, but in inverted position so that a tab attached to one end of the intensifying screen or other radiographic element now engages the lip on the base plate which originally served to stop the flap on the leader of the negative. The tab is temporarily secured to the base plate, whereupon the loaded housing can be inserted into any conventional automatic processor such as that for the Type TPX film packet. The intensifier screen, being now secured to the base plate, is retained in the envelope for reuse, while the exposed negative is drawn into the processor to form the final radiograph, either within layers on its surface, on a receiving sheet, or both.

The apparatus of the invention, and its mode of operation, will best be understood in the light of the following detailed description, together with accompanying drawings, of an illustrative embodiment of the invention.

IN THE DRAWINGS

FIG. 6 is a schematic perspective sketch of an intensifier screen adapted for use with the apparatus of the invention;

FIG. 7 is a highly schematic diagrammatic sketch of the apparatus of FIGS. 1-4 in association with the film packet of the type shown in FIG. 5 at a first stage of manipulation of the apparatus in accordance with the invention;

FIG. 8 is a schematic diagrammatic sketch similar to FIG. 7 showing the parts in a second stage of manipulation in accordance with the invention;

FIG. 9 is a sketch similar to FIGS. 7 and 8 showing the parts in a third stage of manipulation in accordance with the invention, during which an intensifier screen of the type shown in FIG. 6 is inserted;

FIG. 10 is a schematic diagrammatic sketch similar to FIGS. 7-9, showing the parts in the next stage of manipulation in accordance with the invention;

FIG. 11 is a sketch similar to FIGS. 7-10 showing the parts in a final stage of loading of the intensifying screen in accordance with the invention;

FIG. 12 is a schematic diagrammatic sketch similar to that of FIGS. 7-11, showing the loaded film packet removed from the apparatus of the invention and ready for exposure; and FIG. 13 is a schematic diagrammatic sketch similar to those of FIGS. 7-12, showing the exposed packet and intensifying screen loaded back into the apparatus in accordance with the invention preparatory to processing of the exposed negative.

Figure 1:
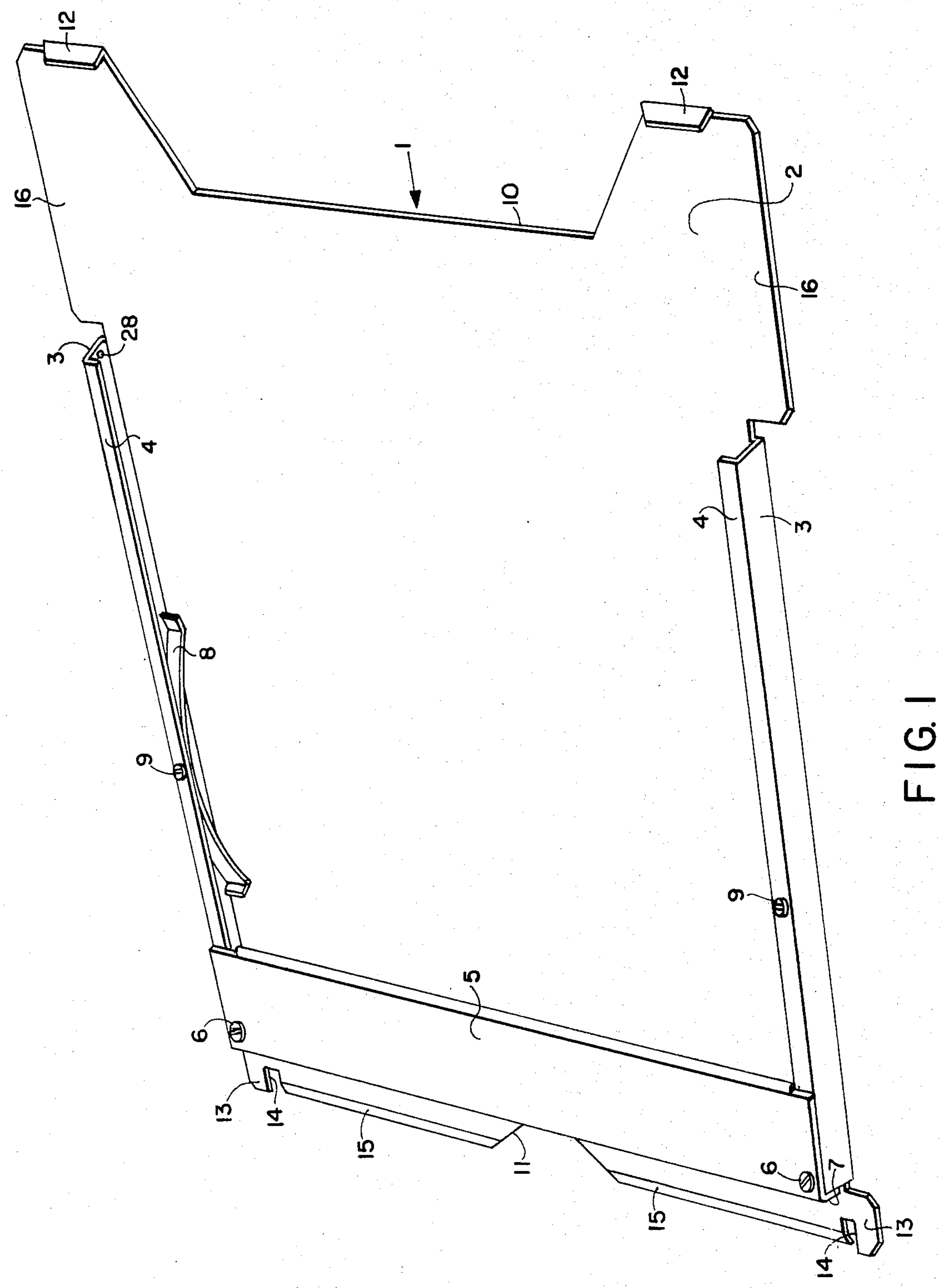
FIG. 1 is a schematic perspective sketch of a housing forming a portion of the apparatus of the invention.

Referring to FIG. 1, the apparatus of the invention comprising a housing generally designated 1 comprising a base plate 2 of sheet metal or the like. At either side of the base plate 2 are formed upstanding flanges 3 comprising sidewalls adapted to confine a platen in a manner to be described. The side flanges 3 are formed with inwardly extending upper flanges 4 extending inwardly generally parallel to the base plate 2.

A cross piece 5, of sheet metal or the like, is secured across the flanges 4 on the left end of the apparatus as seen in FIG. 1, as by screws 6. The cross piece 5 serves to strengthen the apparatus, and also serves to co-act with conventional processing apparatus of the type shown in the above-cited U.S. Pat. No. 4,200,384, simulating a conventional cassette in this operation. A downturned leading edge 7 of the flange 5 serves as the actuating element in this portion of the operation of the apparatus.

Figure 3:
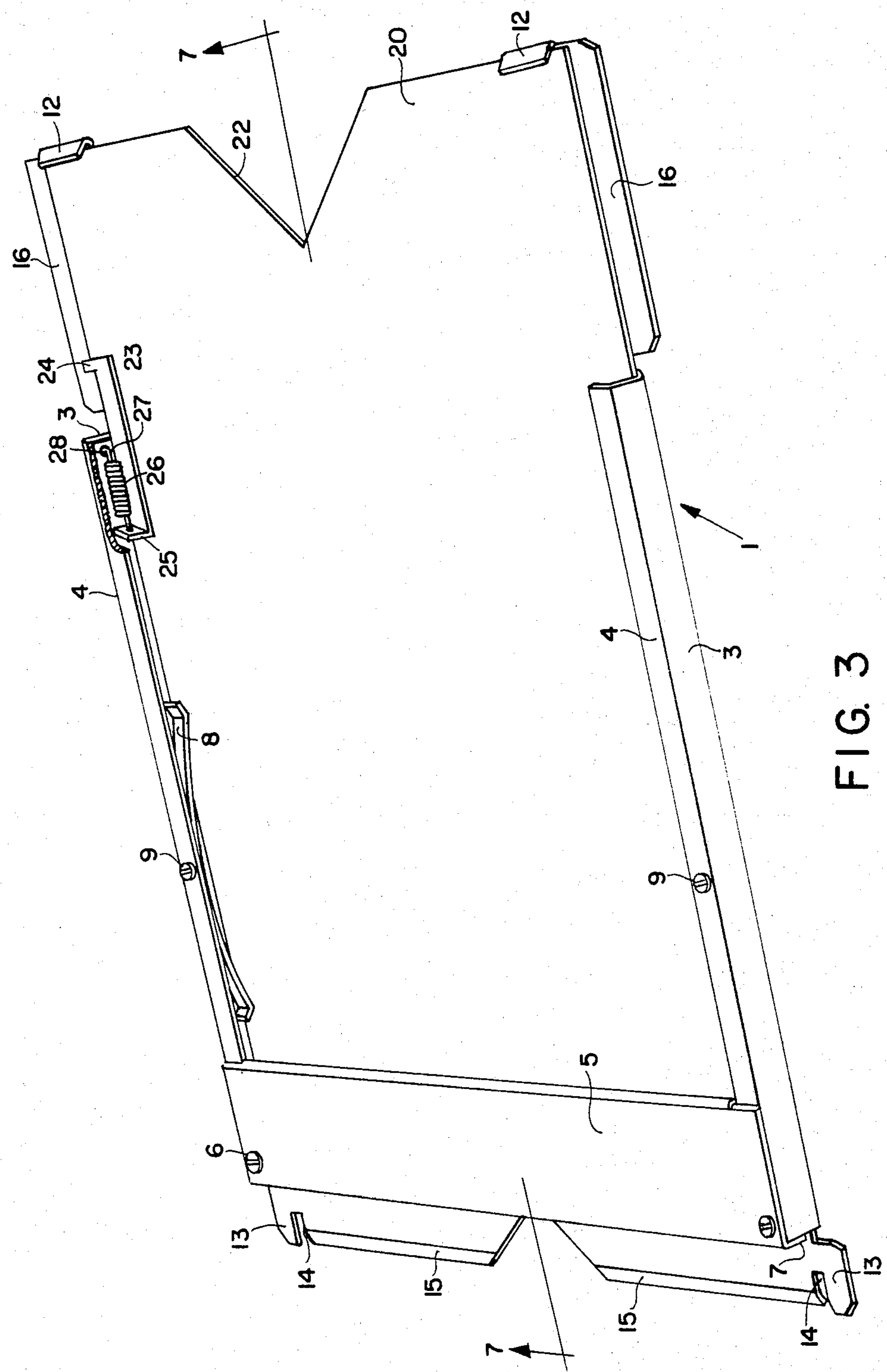
FIG. 3 is a schematic perspective sketch of the housing and platen of FIGS. 1 and 2 in cooperative relationship in a first position.
Figure 4:
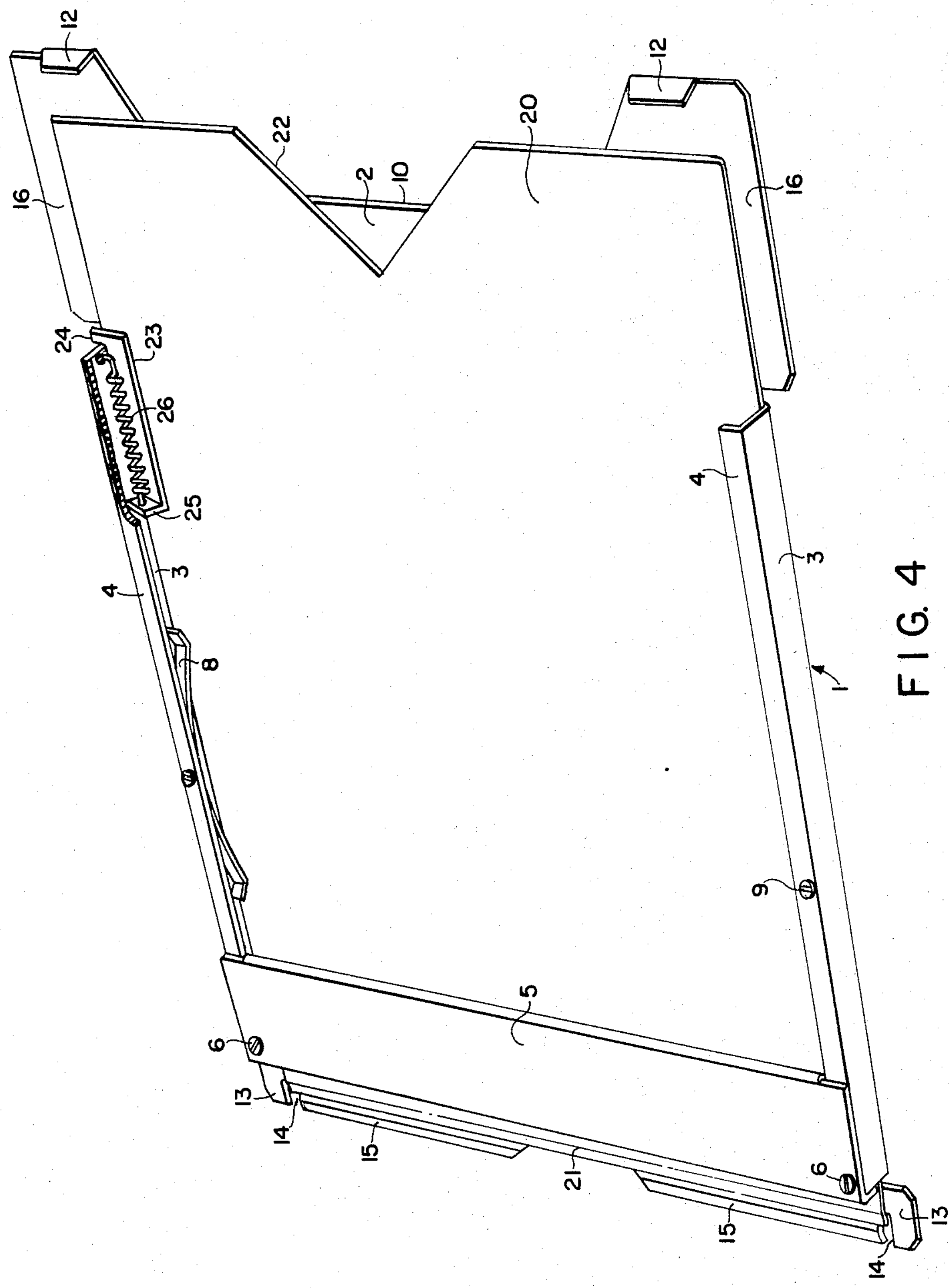
FIG. 4 is a schematic perspective sketch of the housing and platen of FIGS. 1 and 2 in cooperative relation in a second relative position.

A pair of leaf springs 8, one of which is shown in FIGS. 1, 3 and 4, are secured to the flanges 4 by means such as screws 9, and have downwardly extending arms engaging the base plate 2 of the housing when the housing is empty as shown in FIG. 1.

The right end of the base plate 2 as seen in FIGS. 1, 3 and 4 is formed with a notch 10, and the left end is formed with a notch 11, which serve to cooperate with a film packet received in the housing in a manner to be described to facilitate access to the edges of the packet by an operator. At the rear ends of the base plate 2 are formed stops 12, such as tabs bent up from the ends of the base plate 2 as shown, which serve as stops for a platen, to be described, and for the closed end of a film packet envelope received in the housing in a manner to be described.

A pair of projecting ears 13 at the leading edge of the base plate 2 are adapted to cooperate with automatic processing apparatus such as the conventional Polaroid TPX Radiographic Processor with the Polaroid Easy Load Loading Tray accessory. However, this and other external aspects of the housing 1 may be configured to conform to the requirements of any processing apparatus with which it is desired to use the apparatus of the invention.

As shown in FIG. 1, notches 14 are provided in the edge of the base plate 2 at either side. These are adapted to receive end portions of an encircling opaque flap formed integral with the tab of the leader on the negative, as will appear. In practice, it may be desired to remove these corners of the envelopes so that the notches 14 would not be required.

The leading edge of the base plate 2 at the left side as shown in FIG. 1 is formed with downwardly extending lip portions 15 which serve to cooperate with the processing apparatus in the same manner as the corresponding elements of the cassette with which the processer is adapted to be used, and also are adapted to cooperate with a flap on the leader of a negative in a film packet in the practice of the invention in a manner to be described more fully below.

As shown on either side at the right in FIG. 1, the base plate 2 is provided a pair of outwardly extending tabs 16, which also serve to cooperate with the processor in enabling it to perform its conventional function in the intended manner.

Figure 2:
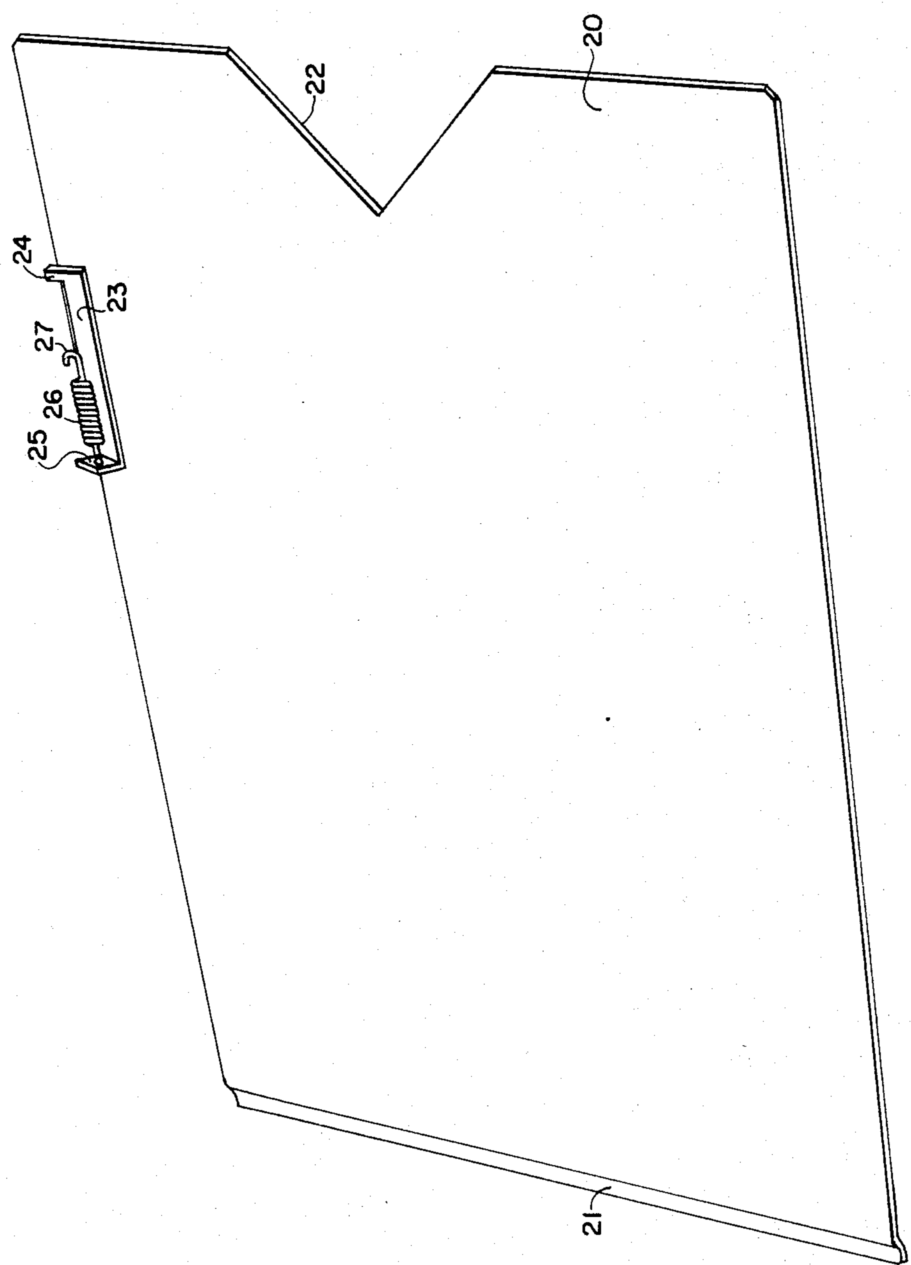
FIG. 2 is a schematic perspective sketch of a platen forming a portion of the apparatus of the invention.

Referring next to FIG. 2, a platen 20, of opaque material such as plastic, sheet metal or the like, is adapted to cooperate with the housing of FIG. 1 in a manner to be described. The platen 20 essentially comprises a rectangular plate which is formed at its left hand edge as seen in FIG. 2 with a generally downwardly and outwardly extending lip portion 21, serving to help form a light seal in the practice of the invention in a manner to appear. A notch 22 is formed on the right side of the platen 20 to allow operator access to a film packet received between the platen and the housing in a manner to be described below.

A support member 23 is welded or otherwise secured to the platen 20 and is formed at its rear edge with a stop 24 adapted to engage one of the flanges 3 of the housing of FIG. 1 and stop the movement of the platen 20 in the housing in a first position. An upstanding flange 25 formed on the member 23 is adapted to receive one end of a conventional coil spring 26 that has a second end 27 adapted to be received in an aperture 28 in one of the flanges 3, as shown in FIGS. 1 and 3.

FIG. 3 shows the housing 1 and platen 20 in assembled relationship, with the platen 20 received between the flanges 3 and below the crosspiece 5. The platen 20 is shown in a home position in the housing with its rear edge engaging the stops 12, being urged into that position by the spring 26. The springs 8 hold the platen 20 down against the base plate 2 of the housing resiliently, to assist in forming a light seal in a manner to be described with a film packet inserted between the platen 20 and the base plate 2 of the housing.

FIG. 4 shows the apparatus of FIG. 3 with the parts in a second position towards which they may be manually urged by an operator exerting a force on a platen 20 with respect to the housing 1 to urge the platen 20 to the left in FIG. 3 into a position in which the stop 24 engages the end of one of the flanges 3 and in which the lip 21 formed at the left end of the platen 20 protrudes out beyond the crosspiece 5 adjacent the lip 15 formed on the base plate 2. The platen 20 is manually displaced toward the position shown in FIG. 4 when it is desired to complete a intensifying screen insertion operation in a manner to be described.

Figure 5:
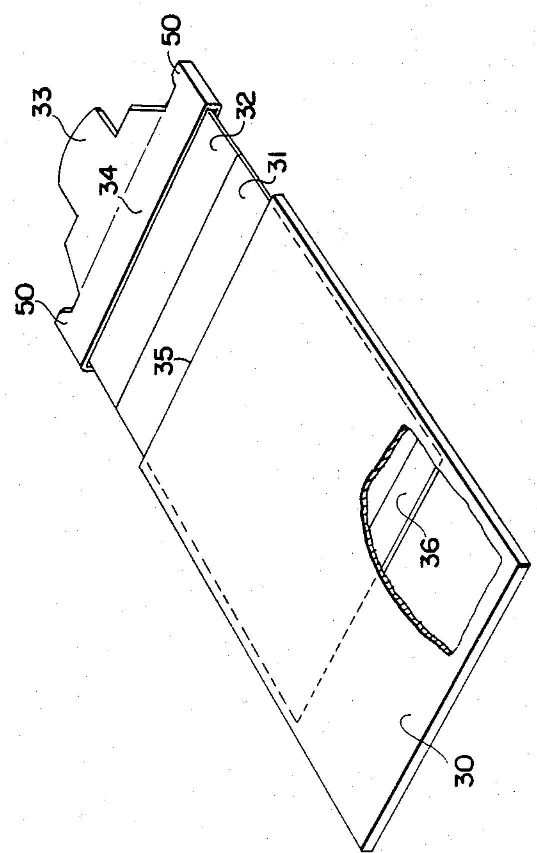
FIG. 5 is a schematic perspective sketch of a conventional film packet, with a negative shown partly withdrawn from the envelope.

FIG. 5 shows schematically a conventional film packet, such as the type TPX 8×10 film packet described above, which basically comprises an opaque envelope 30, of paper or the like, open at one end to slidably receive a photosensitive assembly comprising a negative 31 attached at one end to a leader comprising an opaque and light insensitive tab 32 formed integral with a projecting tab 33 adapted to be grasped by an operator, or preferably by the rolls of an automatic processing apparatus of the type referred to above.

Formed integral with the leader 32 and tab 33 is an encircling flange 34, of paper or the like, which is adapted to surround and confine the open end 35 of the envelope 30 to complete a light tight seal around the negative 31 when the parts are in assembled position.

The negative 31 has attached to its left end, as shown in FIG. 5, a trailer 36 of light insensitive material for purposes irrelevant to the present invention. The trailer 36 stops short of the end of the envelope 30 in the fully inserted position of the negative, and is shown merely to complete the resemblance of the assembly to the Type TPX film assembly.

FIG. 6 shows an intensifying screen 40 of the type adapted for use in the practice of the invention which is of a width generally commensurate with the width of the negative 31 in FIG. 5, and of a corresponding length, and has a leading edge 41 that is contoured to facilitate insertion in the envelope 30 of FIG. 5 between the envelope and the photosensitive side of the negative 31 in a manner to be described below. The screen 40 may be of any conventional plastic material coated with any desired known phosphors in a manner well understood by those skilled in the art, or may be of sheet lead or the like. A folded tab portion 42, of paper, plastic or the like, is attached to the other end of the intensifying screen 40 to effect purposes to be described below.

FIGS. 7 through 13 comprise highly schematic diagrams, which may be equated with corresponding portions of the apparatus of FIGS. 1 through 4 by construing them as views substantially along the lines 7—7 in FIG. 3, in which the essential elements of the apparatus are represented in highly schematic form to show the relative position of the parts during assembly, without the necessity for repeating the structural details which have been described above. In order to effect this expository simplification, it will be apparent that parts have been shown separated, whereas in practice they would be all held compactly together in light sealing relationship under the influence of the springs 8 in FIGS. 1, 3 and 4.

Operation of the apparatus of the invention to load a film packet of the type shown in FIG. 5 with an intensifying screen of the type shown in FIG. 6 will next be described in connection with FIGS. 7-12, it being understood that initially the film packet of FIG. 5 will be in its closed position with the encircling flap 34, formed integral with the tab 33 and leader 32, surrounding the end 35 of the envelope.

As a preliminary matter, while it may be unnecessary to do so, it is preferred to tear off the ends 50 of the encircling flap 34, to essentially provide two spaced flaps 34 open at the corners. This operation can be dispensed with, and if it is, the notches 14 described above will receive the ends of the flap 34, but if the corners 50 are removed the operator will find it much more convenient to effect the operations next to be described.

With the apparatus of the invention in the condition shown in FIG. 4, the platen 20 being held in that position by the operator, a packet of the type shown in FIG. 5 may be inserted with the closed end of the envelope 30 entering between the lip 21 formed on the platen 20 and the lip 15 formed on the base plate 2. As shown schematically in FIG. 7, this insertion can be continued until the flap 34 on one side of the leader 33 engages and receives the lip 15 on the base plate 2, whereupon the parts will be stopped in the position shown in FIG. 7. The operator may now continue movement of the envelope 30, by grasping it in the space provided by the relieving notches 22 in the platen 20 and 10 in the base plate 2, advancing it to the position shown in FIG. 8 in which the open end 35 of the envelope is clear of the flap 34 but still overlying the insensitive leader portion 32 attached to the negative 31. The platen 20, and particularly with the aid of its forward lip 21 and the influence of the springs 8 connected to the housing 2, will prevent a light leak from taking place at this time.

The movement of the envelope 30 in this manner can continue until it is stopped against the stops 12 formed at the end of base plate 2. There is now a gap between the open end 35 of the envelope 30 and the flap 34 attached to the leader 32 into which the contoured end 41 of the intensifier screen 40 may be inserted, whereupon the intensifier 40 is slipped down over the negative 31, with the light emitting side of the intensifier 40 in contact with the emulsion side of the negative 31, until the intensifier 40 is entirely received within the envelope 30 and the parts are in the relative position shown in FIG. 10. The folded tab 42 attached to the intensifier 40 may now be slipped under the adjacent flap 34, and the envelope moved back, with the aid of the platen 20 serving to provide a needed rigidity for this purpose, such that the envelope is returned to its closed position in which its end 35 is received within the flaps 34. The packet loaded with the intensifier 40 in the position shown in FIG. 12 may now be taken to the desired site for exposure.

Following exposure, the packet is returned to the apparatus of the invention, but upside down relative to the position in which it was inserted in connection with the description of FIGS. 7-11, with the insertion being continued in this fashion until the fold 42 on the intensifier 40 which is now below the negative 31, encounters the lip 15 on the base plate 2 and stops further motion of the packet. At this point, the flap 42 is detachably secured to the base plate 2, as by a strip of tape 43, by a post formed integral with the base plate 2 and engaging a corresponding aperture preformed in the tab 42, or by other convenient means.

The housing 1 containing the packet so loaded may next be inserted in a conventional processor of the type described in the above cited U.S. Pat. No. 4,200,384, whereupon the rollers of the processor may grasp the leader 33, withdrawing the exposed negative 31 and carrying it through the desired processing stages. The envelope 30 and enclosed intensifier screen 40 will remain in the housing 1. The housing can now be removed from the processor, and the envelope extracted from the housing. The intensifier 40 may be removed from the envelope for reuse with another film packet in the manner just described above.

While the invention has been described with respect to the details of a specific illustrative embodiment, many changes and variations will become apparent to those skilled in the art upon reading this description, and such can obviously be made without departing from the scope of the invention.

Having thus described the invention, what is claimed is:

1. Apparatus for manipulating a film packet comprising an opaque envelope, a photosensitive sheet slidably received in said envelope and attached to a nonphotosensitive leader extending out through an open end of the envelope, and a flap secured to said leader and adapted to cover the open end of the envelope and form a light tight seal around the photosensitive sheet, said apparatus comprising a base plate of opaque material having major dimensions exceeding those of the envelope, a platen of opaque material, means slidably mounting said platen on said base plate for movement between first and second positions, means mounted on said base plate for resiliently biasing said platen into engagement with said base plate, means forming a lip on a leading edge of said base plate adapted to engage the flap on the film packet when the envelope is inserted between said platen and said base plate to limit movement of the photosensitive sheet between said platen and said base plate, and means forming a stop at a trailing edge of said base plate opposite said leading edge for limiting movement of the envelope inserted between said platen and said base plate to a position in which the open end of the envelope is clear of the flap but still overlies the nonphotosensitive trailer without exposing the photosensitive sheet within the envelope, whereby an intensifying screen may be inserted into the envelope.

2. The apparatus of claim 1, further comprising a lip formed on a leading edge of said platen and adapted to form a light seal between said envelope and said leader when a film packet is inserted between said platen and said base plate.

3. The apparatus of claim 2, further comprising resilient means connected between said base plate and said platen for urging said platen into a position in which a trailing edge of said platen opposite said leading edge engages said stop means on said trailing edge of said base plate.

* * * * *